Dec. 10, 1968　　H. C. SCHULZE　　3,414,951
METHOD AND APPARATUS FOR FORMING BRANCHED PIPE
Filed March 18, 1966
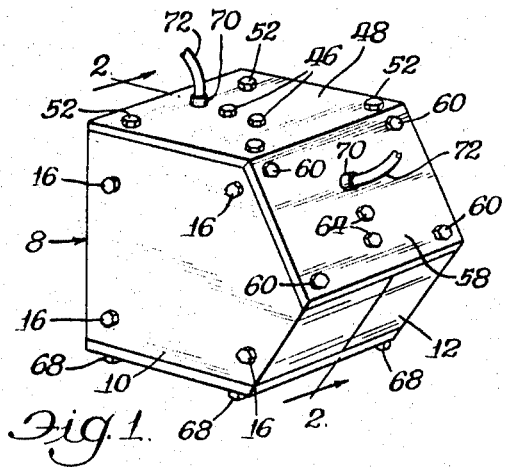
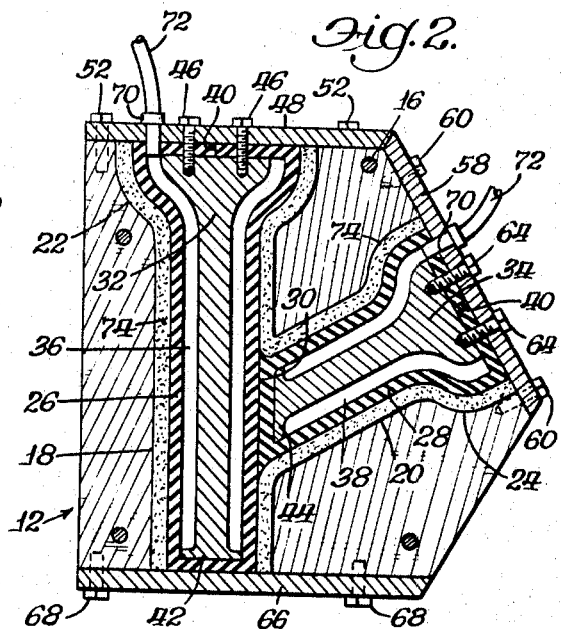
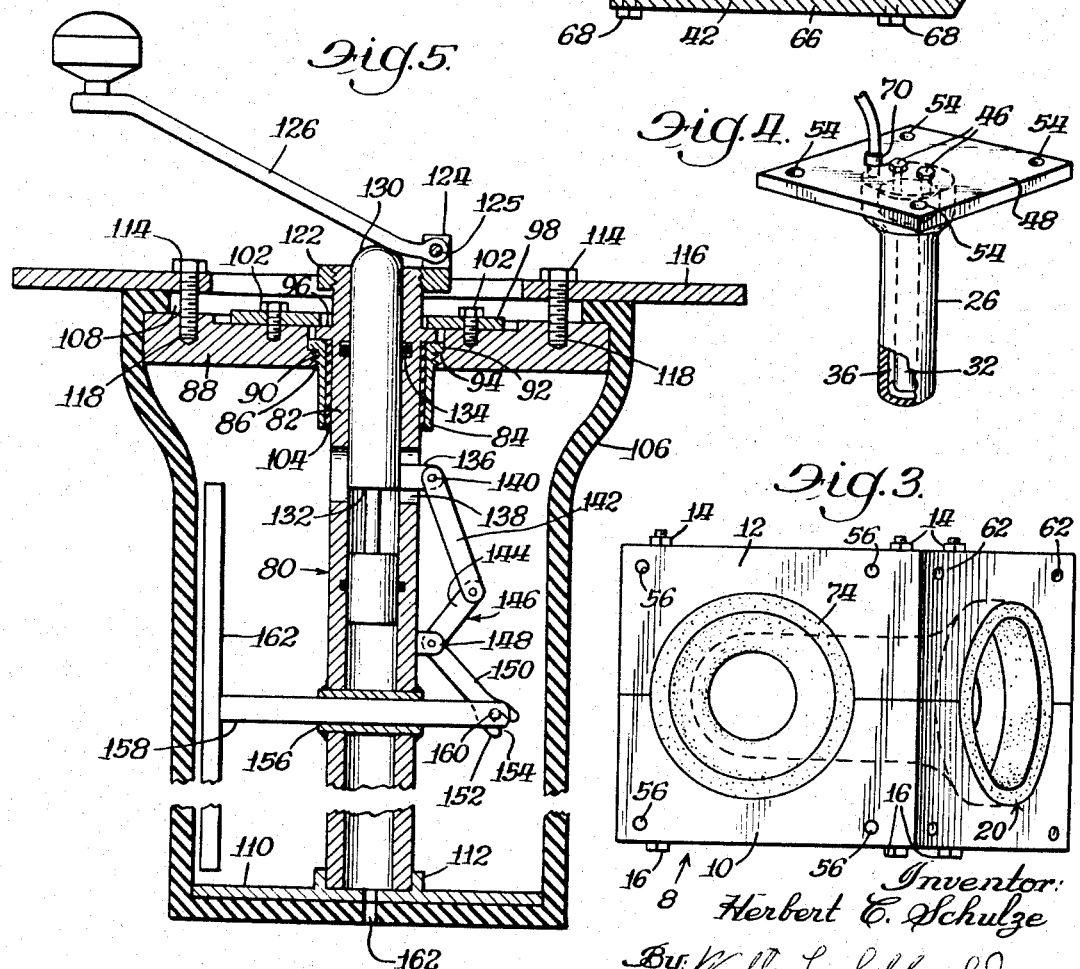
Inventor:
Herbert C. Schulze
By Wally L. Schlegel Jr. Atty.

United States Patent Office 3,414,951
Patented Dec. 10, 1968

3,414,951
METHOD AND APPARATUS FOR FORMING BRANCHED PIPE
Herbert C. Schulze, Carlsbad, Calif., assignor to Amsted Industries Incorporated, Chicago, Ill., a corporation of New Jersey
Filed Mar. 18, 1966, Ser. No. 535,493
6 Claims. (Cl. 25—30)

ABSTRACT OF THE DISCLOSURE

Apparatus for molding hollow articles comprising a mold having a plurality of sections which define a rigid walled cavity. The mold sections are separable and contain fluid, impervious, tubular diaphragms supported in respective openings in the mold and in spaced relationship to the walls of the mold. The diaphragm in the second opening is provided with an innermost wall conforming to the shape of and adjoining a portion of the diaphragm in the first opening. Separate means for applying fluid pressure to the interiors of the diaphragms are provided.

---

This invention relates to branched pipe and, more particularly, to a new and improved method of forming branched pipe and an apparatus for carrying out such a method. The method and apparatus of this invention are especially useful for forming clay pipe branches.

Clay pipe branches are conventionally formed from sections of pipe which have been shaped out of clay, such as by extrusion or isostatic molding, before they have been cured and vitrified. In forming a pipe branch having only one branch section, as for example, two sections of pipe are joined together to obtain the desired configuration by first cutting a suitable opening through the wall of one pipe section and fitting a shorter second pipe section at the desired angle in the opening. The clay at the juncture of the two sections of pipe, still in a moldable condition, is then kneaded together so as to form a unitary structure that is finally dried and baked in a kiln. Considerable difficulty has been experienced in forming satisfactory branched pipe by such a method. Quite frequently a proper bond of the two sections of pipe is not obtained and cracks develop at the juncture of the pipe sections.

Although there is considerable art on utilizing isostatic pressing or molding for forming clay pipe, no satisfactory method of using isostatic pressing to form clay branched pipe has heretofore been disclosed in the prior art. In the isostatic molding of pipe, a moldable material, e.g., clay in a plastic condition, is introduced into an annular chamber between the wall of a pressure resistant body and an elastic tubular body coaxially arranged with respect to the pressure resistant body. The chamber is sealed at its ends and a fluid under pressure is then applied to the side of the elastic body so as to cause it to act upon and compress the clay into a solid body. The applied pressure is released upon completion of this forming operation, and the molded clay body is removed from the chamber and vitrified.

This invention is based on a method and apparatus for isostatically forming clay branched pipe. Briefly, in accordance with this invention, the branched pipe is formed in a sectional mold having two mating mold halves held together so as to form a mold cavity conforming to the desired shape of the pipe to be molded. In forming pipe with a single branch, as for example, the mold includes a first longitudinal opening and a second, usually shorter, longitudinal opening extending from intermediate the ends of the first opening. An elastomeric tubular diaphragm is coaxially held in place within each of the openings in spaced relationship therewith so that the inner end of the tube in the second opening abuts against the tube in the first opening. Connected to the interiors of each of the elastomeric diaphragms are auxiliary means for applying fluid under pressure thereto. The annular spaces between the walls of the openings and the respective elastomeric tubes are filled with clay in a plastic condition and the ends of the openings are then sealed. This is followed by introducing fluid pressure into the interiors of the elastomeric tubes to expand the same so that they act upon the confined clay to compress it into branched pipe.

It is, therefore, a primary object of this invention to provide an improved method and apparatus for isostatically molding branched pipe.

Another object of this invention is to provide a method and apparatus for forming clay branched pipe as a unitary structure.

Still another object of this invention is to provide a method and apparatus for forming clay branched pipe which is less susceptible to cracking than those which heretofore have been produced.

These and further objects of this invention will become apparent or be described as the description thereof herein proceeds and reference is made to the accompanying drawings, in which:

FIGURE 1 is a perspective view of a preferred embodiment of the mold of this invention;

FIGURE 2 is a vertical sectional view taken along the line 2—2 of FIGURE 1, which is in the plane wherein the mold sections adjoin one another;

FIGURE 3 is a plan view of the mold shown in FIGURE 1 with the end plates and elastomeric cores removed, but with the molded branch pipe in place;

FIGURE 4 is a perspective view, partly in section, of an elastomeric diaphragm and core attached to an end plate; and FIGURE 5 is a vertical sectional view of an alternative embodiment of a diaphragm, core and end plate.

Referring to the drawings and particularly FIGURES 1 to 4, the mold 8 includes mating mold halves 10 and 12 which are held together by nuts 14 engaging bolts 16 that extend through the mold. Mold halves 10 and 12 of the assembled mold 8 define a cavity corresponding to the configuration of the fitting to be formed. The illustrated mold is one for forming pipe with a single branch and, accordingly, it consists of longitudinal opening 18 (wherein the main section is formed) and longitudinal opening 20 (wherein the branch section is formed) extending from intermediate the ends of longitudinal opening 18. It will be noted that the axes of cylindrical openings 18 and 20 are in the plane wherein mold halves 10 and 12 adjoin one another so as to facilitate the removal of the molded pipe as hereinafter described. Longitudinal openings 18 and 20 are formed with enlarged end portions 22 and 24, respectively, for forming "bell" sections on the pipe for the accommodation of the spigot ends of connecting pipes.

Disposed within longitudinal openings 18 and 20 in spaced relationship with the walls thereof are tubular diaphragms 26 and 28, respectively, which are fabricated of an elastomeric fluid-impervous material, such as rubber. Preferably, diaphragms 26 and 28 correspond to the respective shapes of openings 18 and 20 and are coaxial with respect to the respective longitudinal openings so as to form fittings with walls of substantially uniform thickness. Inner end wall 30 of diaphragm 28 conforms to the shape of and abuts against the wall of diaphragm 26.

Extending within diaphragms 26 and 28 for the entire lengths thereof are cores 32 and 34, respectively. The side walls of cores 32 and 34 are spaced from side walls of the elastomeric diaphragms so as to form annular spaces 36 and 38, respectively, wherein a pressurizing fluid is introduced, as hereinafter described. Diaphragms 26 and 28 are preferably provided with slits 40 through which cores 32 and 34 may be conveniently inserted within the respective tubes. Preferably, innermost end 42 of core 32 is flared to the side walls of diaphragms 26 and, similarly, the innermost end 44 of core 34 is flared to the side walls of diaphragm 28. End 44 conforms to the shape of the adjoining portion of diaphragm 28.

The assembly consisting of elastomeric diaphragm 26 and core 32 is coaxially held in place within opening 18 by bolts 46, extending through rigid, solid, end plate 48 and engaging threaded openings in core 32. End plate 48 is fastened to the mold by bolts 52 extending through openings 54 in end plate 48 and engaging threaded apertures 56 in the mold. Similarly, rigid, solid, side plate 58 is secured to mold halves 10 and 12 by bolts 60 engaging threaded openings 62 in the mold, and core 34 is bolted to side plate 58 by bolts 64 to hold elastomeric diaphragm 28 coaxially in place with respect to opening 20. Rigid, solid, bottom plate 66 is removably attached to the mold by bolts 68.

End plate 48 and side plate 58 are each provided with connections 70 communicating with the respective spaces 36 and 38. Connections 70 are attached to valve-controlled conduits 72 which communicate with a suitable source of fluid pressure, such as an air compressor.

The use of the mold will be apparent from the foregoing description, from which it will be seen that the portion of the mold cavity externally of diaphragms 26 and 28 is filled with clay 74 in a moldable condition when the mold is assembled as illustrated in FIGURES 1 and 2, except that bottom plate 66 is removed. More specifically, mold halves 10 and 12 are bolted together, and end plate 48 and side plate 58 are secured thereto so as to support the assemblies consisting of core 32 within diaphragm 26 and core 34 within diaphragm 28, respectively, in place.

The mold is situated so that the end thereof to which bottom plate 66 is to be secured (i.e., the lower end in FIGURES 1 and 2) is in the uppermost position. The spaces between the walls of longitudinal openings 18 and 20 and the respective elastomeric diaphragms 26 and 28 are filled with clay 74 in a plastic condition through the annular opening between diaphragm 26 and opening 18, using a vibrator if desired. Thereafter, bottom plate 66 is secured to hte mold by bolts 68 and fluid pressure is applied through conduits 72 and connections 70 to the interiors of diaphragms 26 and 28, so as to cause them to press the clay against the walls of the mold cavity and mold a branched pipe. Various pressures may be used for this operation depending upon factors such as the moisture content of the clay, the desired density of the finished completed pipe, and the like. For example, satisfactory branched pipe may be formed from clay having a moisture content of about 10% by using pressures of about 5,000 pounds per square inch. Finally, the pressure is relaxed and the mold is disassembled to remove the molded article, which is then dried and vitrified in a kiln by using standard procedures.

If desired, pipe having smoother interior surfaces than those produced by utilizing the apparatus illustrated in FIGURES 1 to 4 may be obtained by using the elastomeric diaphragm-core assembly shown in FIGURE 5. Referring to FIGURE 5, the core 80 includes rigid tube 82 which is rotatably mounted in bushing 84. Bushing 84 extends through the opening 86 in support plate 88 and is held in place, as by threads 90, with lip 92 on the end of bushing 84 resting upon shoulder 94 of opening 86. Tube 82 is formed with radial ridge 96 that rests on lip 92 and is held in place by retaining ring 98 which is secured to support plate 88 by bolts 102. Pressure seal 104 is provided between rigid tube 82 and bushing 84 to prevent leakage of the pressurizing fluid to be hereinafter described.

Tube 82 extends within elastomeric diaphragm 106 for the entire length thereof. Diaphragm 106 is formed at the top with opening 108 through which core 80 is inserted. The other end of elastomeric diaphragm 106 is preferably provided with rigid, e.g., metal, disc 110 which is formed with annular projection 112 having an interior diameter slightly greater than the exterior diameter of tube 82. The end of tube 82 bears against disc 110 within projection 112 to keep core coaxial with respect to diaphragm 106. Core 80 and diaphragm 106 are supported within a mold cavity (e.g., opening 18 of FIGURES 1 to 4) by bolts 114 extending through top or end plate 116 and engaging threaded openings 118 in support plate 88. Bolts 114 are tightened sufficiently to provide fluid tight seals between diaphragm 106 and both the support plate 88 and end or top plate 116.

Threadably fastened to the upper end of tube 82 is collar 122, which is held fixed to tube 82, as by being keyed thereto, so that it is rotatable with tube 82. Collar 122 is formed with stud 124 to which crank 126 is pivotally attached by pin 128. Crank 126 bears against bulbous end 130 of rod 132 that is reciprocally mounted within tube 82. Pressure seal 134 is provided between tube 82 and rod 132 to prevent the pressurizing fluid from leaking out of elastomeric diaphragm 106.

Stud 136 on rod 132 extends through axially-extending slot 138 in rigid tube 82. Pivotally attached to stud 136 by pin 140 is straight lever 142, which is also pivotally attached to leg 144 of L-shaped lever 146. L-shaped lever 146 is also pivotally secured to stud 148 on tube 82. The end 150 of L-shaped lever 146 remote from lever 142 is bifurcated to form a pair of spaced fingers 152, the space between fingers 152 serving as cam-receiving opening 154. Bushing 156 extends in a radial direction through tube 82 and supports rod 158 for reciprocal movement. Rod 158 is provided at one end with circular cam 160 which fits snugly within opening 154 so that any movement of L-shaped lever will impart movement of rod 158 within bushing 156. Wiping bar 162, extending in a direction parallel to the side walls of diaphragm 106 for substantially the entire length of the diaphragm 106, is secured to the end of rod 158 remote from cam 160. The bottom of tube 82 is vented at 162.

In the use of this embodiment, the assembly comprised of core 80 and diaphragm 106 is coaxially mounted by plate 116 within an opening of the mold cavity, i.e., opening 18 of FIGURES 1 to 4, to form an annular space between diaphragm 106 and the walls of the opening. The annular space is filled with clay in a moldable condition as hereinbefore described with respect to the embodiment illustrated in FIGURES 1 to 4. A fluid under pressure, preferably an oil in this embodiment, is introduced within diaphragm 106 through a connection extending through support plate 88 (not shown for the sake of simplicity) so that the diaphragm compresses the clay. This is followed by pressing crank 126 down and then rotating it. The downward movement of crank 126 against end 130 to cause the downward movement of rod 132, and hence stud 136. It will be evident that this action of stud 136 will impart motion to rod 158 through the linkage comprising levers 142 and 144 to move wiping bar 162 so that it engages the side walls of diaphragm 106. The rotation of crank 126 rotates tube 82 to impart a wiping motion of bar 162 against diaphragm 106. This wiping motion of bar 162 serves to make a smooth interior surface on the clay being compressed by the pressure of diaphragm 106. After this operation is completed, the pressure is relaxed and the mold is disassembled to remove the branched pipe from the mold.

As hereinbefore mentioned, this embodiment can be used in place of either or both of the diaphragm and core assemblies of FIGURES 1 to 4. However, when it is used to form the branch section (i.e., in place of elastomeric tube 28 and core 34), it will be evident that disc 110 will be wedge-shaped so that the surface thereof against which tube 82 bears will be radial with respect to tube 82.

Although this invention has been described in relation to specific embodiments, it will be apparent that other modifications may be made by those skilled in the art without departing from the intended scope of this invention as defined by the appended claims. For example, the mold may be constructed for forming more than one branch section and the axes of the branch sections may or may not be normal to the axis of the main section.

I claim:

1. In an apparatus for molding hollow articles comprising a mold having a rigid-walled cavity, an elongated, hollow, fluid-impervious, elastomeric diaphragm supported within said cavity in spaced relationship with the walls thereof so as to form a compression space therebetween, means for closing the ends of said compression space, and means for applying fluid pressure to the interior of said diaphragm so as to cause the side walls thereof to expand; the combination of a movable wiping member engageable with the interior surface of said side walls when said diaphragm is expanded, and means for contacting said wiping member with said interior surface and moving said wiping member so that it wipes substantially said interior surface.

2. Apparatus according to claim 1 wherein the wiping member is rotatably mounted within said diaphragm for a major portion of the entire length thereof.

3. Apparatus for molding hollow articles comprising a mold having a mold cavity, a rotatable member mounted on said mold within said cavity, a sealed gas-tight bladder disposed in said cavity and containing said rotatable member, means for introducing pressure gas into said bladder to compress moldable material around said bladder in said cavity, wiper means carried by said member for wiping engagement with the interior of said bladder, and means for rotating said member to acuate said wiping means.

4. Apparatus according to claim 3 wherein the rotatable member is hollow, and wherein a plunger in said member is operatively connected to said wiping means to urge the latter against the bladder, and wherein said rotating means is operatively connected to the plunger for actuation thereof.

5. Apparatus according to claim 4 wherein the operative connection between the plunger and the wiping means comprises a fulcrum on said rotatable member, a lever pivoted to said fulcrum, a connecting rod connected to said lever and said wiping means, and a link connecting the plunger to the lever.

6. Apparatus according to claim 5 wherein the first-mentioned rod extends through a passage extending transversely through the rotatable member.

References Cited

UNITED STATES PATENTS

| 1,552,064 | 9/1925 | Lake. |
| 2,395,216 | 2/1946 | Fitzpatrick. |
| 2,865,079 | 12/1958 | Marchioli et al. ____ 264—314 |
| 3,161,934 | 12/1964 | Gremigni. |

FOREIGN PATENTS

| 265,393 | 10/1913 | Germany. |
| 986,332 | 3/1965 | Great Britain. |
| 296,776 | 3/1932 | Italy. |

WILLIAM J. STEPHENSON, *Primary Examiner.*

U.S. Cl. X.R.

18—45; 25—128; 249—145, 183